March 22, 1966 J. R. LAUGHLIN ETAL 3,242,299
INDUCTOR FOR INDUCTION HEATING APPARATUS
Filed Oct. 17, 1963
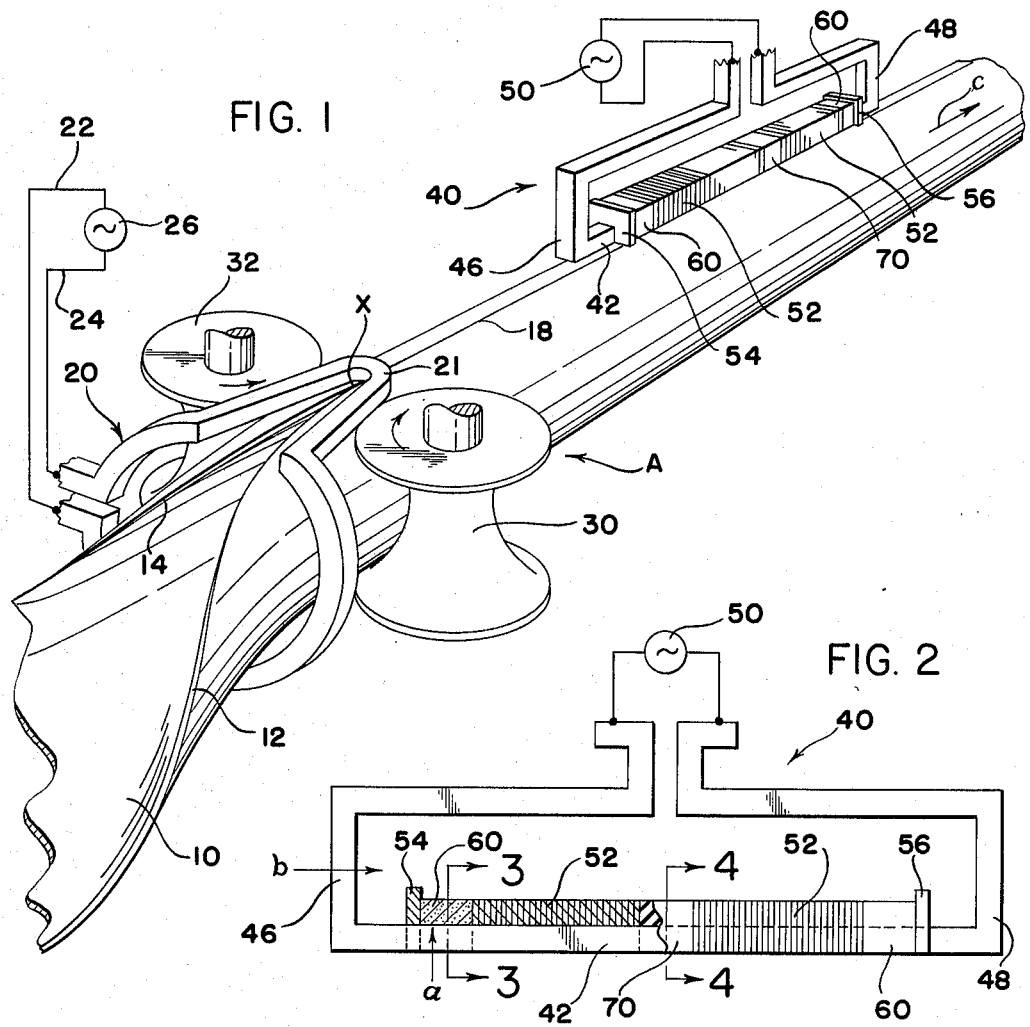
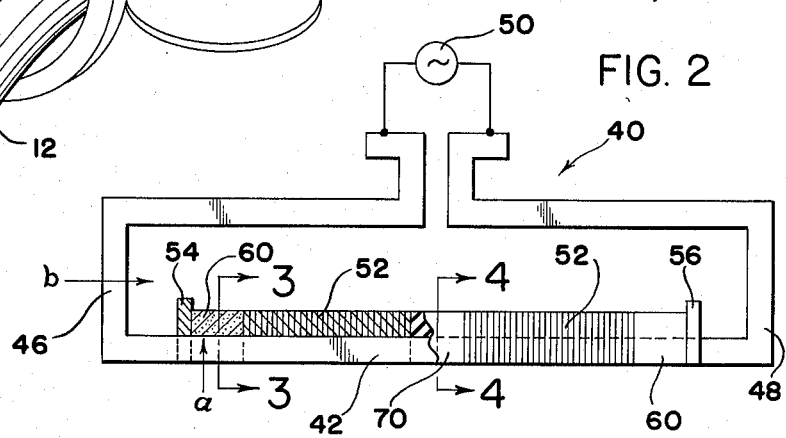
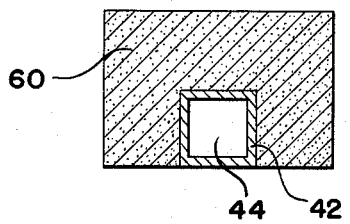
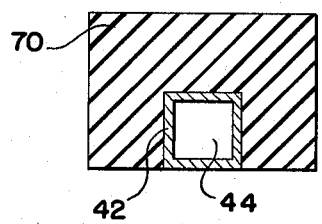
INVENTORS.
JOHN R. LAUGHLIN,
JAMES W. THOMAS &
BY RICHARD A. SOMMER
ATTORNEYS

United States Patent Office
3,242,299
Patented Mar. 22, 1966

3,242,299
INDUCTOR FOR INDUCTION HEATING APPARATUS
John R. Laughlin, Brecksville, James W. Thomas, Brookpark Village, and Richard A. Sommer, Warren, Ohio, assignors to Ohio Crankshaft Company, Cleveland, Ohio, a corporation of Ohio
Filed Oct. 17, 1963, Ser. No. 316,912
6 Claims. (Cl. 219—8.5)

The present invention is directed toward the art of induction heating and more particularly to an improved inductor for an induction heating apparatus.

This invention is particularly applicable to a post heat inductor for a tube mill and it will be described with particular reference thereto; however, it is to be appreciated that the invention has much broader applications and it may be used in the construction of inductors for various induction heating apparatus.

Seam welded pipe or tubing is usually produced in a tube mill wherein a flat skelp is wrapped into a tubular configuration and the converging edges of the skelp are welded together to produce a longitudinally extending seam. The primary consideration when welding the converging edges of the skelp together is the provision of a sound welded seam; therefore, it is often necessary to heat and cool the metal forming the welded seam at a rate which does not produce such metallurgical properties as good ductility. Consequently, in most tube mills, there is provided a post heat inductor positioned directly above the moving seam of the pipe or tube after it has been welded together which inductor anneals the seam so that the seam has the necessary metallurgical properties for the intended use of the pipe or tube.

A post heat inductor usually includes an elongated conductor positioned directly over the moving seam of the pipe and a lead-in conductor at both ends of the elongated conductor for connecting the elongated conductor to a source of alternating current. A stack of iron laminas is usually provided on the longitudinally extending, elongated conductor to increase the flux density in the area of the pipe adjacent the seam which increases the efficiency of the post heating operation. This stack of iron laminas is compressed between two structural elements secured onto the elongated conductor so that the laminas form a tight, compact unit on the longitudinally extending conductor directly above the seam of the moving pipe.

Although such an inductor is quite satisfactory for inductively heating the seam of the rapidly moving pipe or tube, it has been found that the magnetic field adjacent the lead-in conductors at both ends of the elongated conductor intersect the few laminas adjacent these ends at an angle which causes eddy currents to flow in the plane of these laminas, which currents overheat the laminas and destroy their effectiveness.

The stacked laminas extending along the length of the conductor are pressed together which results in a further disadvantage of the prior post heat inductors. Since the coefficient of thermal expansion of the copper used in the formation of the elongated conductor is between 50% and 100% greater than the coefficient of thermal expansion of the iron laminas forming the stack, there is a considerable differential in thermal expansion between the conductor and the lamina stack as the lamina stack is heated during operation of the tube mill. In addition, the conductor is water cooled so that there is a substantial difference between the temperature of the laminas and the temperature of the conductor. This expansion differential and difference in temperature between the conductor and the laminas result in warpage of the conductor. Although this warpage may be very slight for a given length of the elongated conductor, problems are still created because the conductor is spaced only slightly from the moving pipe and the conductor may often be four to six feet in length to obtain the proper annealing temperature of the rapidly moving pipe. Consequently, even slight warpage per length of conductor can force the central portion of the conductor downwardly against the moving pipe. It is obvious that this contact between the conductor and the moving pipe will result in both electrical and mechanical failure of the inductor.

These and other disadvantages are completely overcome by the present invention which is directed toward an inductor of the type described above which does not tend to warp during use even though it is provided with a compact stack of magnetic laminas and has a considerable length.

In accordance with the present invention there is provided an improvement in an inductor comprising an elongated conductor, a stack of magnetic laminas supported on the elongated conductor and extending longitudinally thereof and two structural elements on the conductor for compressing the lamina stack into a tight unit. The improvement comprises a heat resistant, resilient block within the lamina stack and intermediate the structural elements and a block of magnetically permeable material having high electrical resistance in all directions located between the lamina stack and each structural element.

The heat resistant, resilient block absorbs the excessive expansion of the heated laminas within the stack, so that this expansion does not cause substantial warpage of the conductor itself.

The term "non-directional" is used to define the material forming the blocks at the ends of the conductor and, as used herein, indicates a material which is affected by a magnetic field in substantially the same manner irrespective of the direction that the magnetic field travels through the material. Such a material may include iron filings supported within a plastic matrix or sintered iron oxide wherein the oxide forms insulation between the separate particles. Consequently, a non-directional material is one wherein there is no substantially continuous high conductive path through the material in any given direction or, stated another way, the material has a high electrical resistance in all directions. In the case of iron lamina, there is a continuous current path along the face of the lamina, and, for this reason, this material is not considered to be non-directional as the term is used herein.

The primary object of the present invention is the provision of an inductor of the type adapted for use as a post heat inductor of a tube mill which inductor is highly efficient and does not tend to warp to a great extend during use.

Another object of the present invention is the provision of an inductor of the type adapted for use as a post heat inductor of a tube mill which inductor includes the conventional stack of iron or magnetic laminas with means for absorbing the longitudinal expansion of this stack.

Still another object of the present invention is the provision of an inductor of the type adapted for use as a post heat inductor of a tube mill which inductor includes the conventional stack of iron or magnetic laminas with a heat resistant, resilient block within the stack and intermediate the ends thereof.

Yet another object of the present invention is the provision of an inductor of the type adapted for use as a post heat inductor of a tube mill which inductor includes the conventional stack of iron or magnetic laminas held onto an elongated conductor by two structural elements at each end of the conductor and which inductor does not overheat the laminas adjacent the ends of the conductor.

These and other objects and advantages will become apparent from the following description used to illustrate the preferred embodiment of the present invention read in connection with the accompanying drawing in which:

FIGURE 1 is a schematic, pictorial view illustrating the preferred embodiment of the present invention;

FIGURE 2 is a front elevational view of the preferred embodiment of the present invention;

FIGURE 3 is a cross sectional view taken generally along line 3—3 of FIGURE 2, and FIGURE 4 is a cross sectional view taken generally along line 4—4 of FIGURE 2.

Referring now to the drawing, wherein the showings are for the purpose of illustrating a preferred embodiment of the invention only and not for the purpose of limiting same, FIGURE 1 shows a somewhat conventional tube mill A for forming a rapidly moving skelp 10 into a tubular configuration with the edges 12, 14 gradually converging at a welding point designated as X. The skelp is progressing through the tube mill A in the direction indicated by the arrow $c$ shown in FIGURE 1 and when the skelp exits from the mill it is in the form of a pipe or tube having a longitudinally extending welded seam 18. As is common practice, the converging edges 12, 14 are welded together by an inductor 20 having a nose 21 extending generally along the converging edges and across the edges adjacent welding point X. The inductor 20 is connected, through leads 22, 24, unto an appropriate power supply 26 which may take the form of an oscillator, a high frequency generator or various other such power supplies. The inductor induces a voltage in the moving skelp so that a current flows along the converging edges and between the edges adjacent to the welding point X. Thus, the edges are first pre-heated then welded together. To assure that the converging edges are in abutting relationship as they are welded, there are provided pressure rolls 30, 32 rotating as indicated by the arrows shown in FIGURE 1. It is appreciated that the tube mill A has been schematically represented for the purpose of illustrating the environment to which the present invention is particularly adapted.

In accordance with the invention, the post heat inductor 40 for mill A includes an elongated conductor 42 which extends along seam 18 for inductively heating the seam to an annealing temperature. The speed of the tube, the material being heated, and the power being applied to the inductor 40 determine the longitudinal length of the conductor 42, which in many cases may approach four to six feet in length. To dissipate the heat loses of the inductor, there is provided a coolant passage 44 extending through the elongated conductor 42 in a manner commonly known in the induction heating art. Angularly disposed at either end of conductor 42 are lead-in conductors 46, 48 which are coupled onto a power supply 50 for energizing the conductor 42. The power supply 50 may take various forms such as a generator or oscillator. As so far described, as an alternating current is applied to the conductor 42, the conductor induces a voltage within the moving skelp 10 adjacent the welded seam 18 which voltage causes a heating current to flow adjacent the seam 18. This heating current raises the temperature of the skelp adjacent the seam to the necessary annealing temperature for imparting the desired metallurgical characteristics to the welded seam.

To concentrate the magnetic flux caused by the current flow within conductor 42, the conductor is provided with a stack 52 of thin laminas which are formed from a magnetically permeable material, such as soft iron. By forming these laminas with a generally U-shape, these laminas can straddle the conductor 42 to concentrate the magnetic field caused by current flow within the conductor in the areas adjacent the welded seam 18 as the seam passes under the inductor 40. To maintain the laminas in a compact unit there are provided spaced plates 54, 56 adjacent the opposite ends of stack 52 and also adjacent the lead-in conductors 46, 48.

As so far described, the inductor 40 is not substantially different from normal inductors used for post heating in a tube mill; however, these prior inductors had certain disadvantages. For instance, the magnetic field created by the current flow in conductor 42 would have a direction indicated by arrows $a$ in FIGURE 2 which direction is substantially perpendicular to the direction of current flow through the conductor 42. Since the separate laminas in stack 52 were aligned with this direction of the magnetic field, the laminas were not substantially heated by the magnetic field created around conductor 42; however, the magnetic field around the lead-in conductors 46, 48 is in the direction of arrow $b$ which direction is substantially perpendicular to the direction of the magnetic field in conductor 42 and causes a substantial heating of the laminas adjacent the lead-in conductors 46, 48. In the prior art, these laminas adjacent the lead-in conductors would become overheated and lose their magnetic properties which decreases the efficiency of the post heat inductor.

This difficulty is completely eliminated by the present invention wherein blocks 60 shown in FIGURES 2 and 3 are positioned between the plates 54, 56 and the stack 52 at the location where the lamina stacks of the prior art inductors were under the influence of both magnetic fields $a$ and $b$. The remainder of the laminas within stack 52 are under the influence of only the magnetic field $a$ which magnetic field does not cause overheating. In accordance with the present invention, the blocks 60 are formed from a non-directional, high permeability material such as particles of ferrite, iron carbonyl or iron which particles are held together by a sintering operation or by a low magnetic permeability non-conductive binder. The blocks have a high resistivity in all directions which resistivity may be as low as 400 microhm-cm. at 20° C. An appropriate binder would be an epoxy resin compound, a phenolic resin compound, or a similar compound. The term non-directional has been defined above to indicate that there is no substantial conductive path through the material in any given direction; therefore, irrespective of the direction of the magnetic field passing through the material, there is not an appreciable amount of $I^2R$ heating. The iron laminas within stack 52 are directional because they do have a conductive path across their faces which causes a substantial $I^2R$ heating when the laminas are subjected to a magnetic field extending perpendicular to their faces.

By providing the blocks 60 of non-directional material adjacent the lead-in conductors 46, 48 the magnetic field $b$ does not tend to cause overheating of the ends of stack 52; therefore, the flux concentrating efficiency of the conductor 42 is not impaired during use. The non-directional material is not used over the complete length of the conductor 42 since this material is inherently less efficient and more expensive than the soft iron laminas forming the major portion of stack 52 although it is more efficient than such laminas when they are overheated.

The total thermal expansion of the heated laminas within stack 52 is substantially greater than the thermal expansion of the copper forming the conductor 42 because the conductor is being continuously cooled. This differential in expansion causes warpage in the prior inductor; however, such warpage is completely eliminated by the present invention. In accordance with the present invention, as shown in FIGURES 2 and 4, the stack 52 is provided with an intermediate block 70 which block is heat resistant and resilient so that it can absorb the increase in length due to the greater expansion of the stack 52 during use of the inductor 40. Although a variety of materials could be used at the intermediate resilient block in the stack 52, in accordance with the preferred embodiment of the present invention, this block 70 is formed from silicone rubber or asbestos wicking, each of which meets the requirement of being heat resistant and resilient. In addition, this block 70 should be non-conductive although it is possible to include therein certain magnetic particles which would assist in concentrating the magnetic field below the block 70.

It is appreciated that the inductor 40 may include only the non-directional magnetic blocks 60 or only the heat resistant, resilient block 70 without departing from the intended spirit and scope of the present invention.

Various structural changes may be made in the present invention without departing from the intended spirit and scope of the present invention as defined by the appended claims.

Having thus described our invention we claim:

1. In an inductor comprising an elongated conductor having a first and a second end, each end being connected onto a lead-in conductor angularly disposed with respect to said elongated conductor, a stack of magnetic laminas supported on said elongated conductor and extending between said ends, and structural elements at both ends of said elongated conductor for compressing said lamina stack into a tight unit, the improvement comprising: a block of magnetically permeable material having high electrical resistivity in all directions being located between said lamina stack and said structural elements at each end of said elongated conductor and a heat resistant, resilient block within said stack and intermediate the structural elements.

2. The improvement as defined in claim 1 wherein said material forming said magnetically permeable blocks is a bonded, powdered magnetically permeable material.

3. The improvement as defined in claim 2 wherein said bonded, powdered magnetically permeable material is selected from the class consisting of ferrite powder, iron carbonyl powder and iron powder.

4. The improvement as defined in claim 1 wherein said material forming said magnetically permeable blocks comprises sintered, powdered magnetically permeable material.

5. The improvement as defined in claim 1 wherein said material forming said magnetically permeable blocks comprises powdered magnetically permeable material bonded within a resin material.

6. The improvement as defined in claim 1 wherein said heat resistant, resilient block is formed from a material selected from the class consisting of silicon rubber and asbestos wicking.

References Cited by the Examiner

UNITED STATES PATENTS

| | | | |
|---|---|---|---|
| 2,493,950 | 1/1950 | Dow et al. | 219—10.79 |
| 2,715,171 | 8/1955 | Williamson | 219—8.5 |
| 2,772,956 | 12/1956 | West et al. | 75—0.56 |
| 2,777,041 | 1/1957 | Dustman | 219—10.79 |
| 2,785,263 | 3/1957 | Van Iperen | 219—10.79 |
| 2,812,276 | 11/1957 | West et al. | 75—0.56 |

RICHARD M. WOOD, *Primary Examiner.*